US010062379B2

(12) United States Patent
Katuri et al.

(10) Patent No.: US 10,062,379 B2
(45) Date of Patent: *Aug. 28, 2018

(54) ADAPTIVE BEAM FORMING DEVICES, METHODS, AND SYSTEMS

(71) Applicant: Honeywell International Inc., Morris Plains, NJ (US)

(72) Inventors: SrinivasaRao Katuri, Bangalore (IN); Soumitri Kolavennu, Blaine, MN (US); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,305

(22) Filed: Sep. 16, 2016

(65) Prior Publication Data

US 2017/0004826 A1    Jan. 5, 2017

Related U.S. Application Data

(63) Continuation of application No. 14/301,938, filed on Jun. 11, 2014, now Pat. No. 9,451,362.

(51) Int. Cl.
G10L 15/20 (2006.01)
H04R 3/02 (2006.01)
(Continued)

(52) U.S. Cl.
CPC ............ *G10L 15/20* (2013.01); *G10L 15/22* (2013.01); *G10L 15/30* (2013.01);
(Continued)

(58) Field of Classification Search
CPC ....... G10L 15/22; G10L 15/30; G10L 15/265; G10L 21/0208; G10L 15/20; G10L 25/78; G10L 25/87; G10L 15/02
See application file for complete search history.

(56) References Cited

U.S. PATENT DOCUMENTS 6,882,971 B2    4/2005 Craner
2009/0055180 A1*  2/2009 Coon ................. B60R 16/0373
704/251

(Continued)

FOREIGN PATENT DOCUMENTS

WO    2006082764 A1    8/2006
WO    2014143439 A1    9/2014

OTHER PUBLICATIONS

Combined Search and Examination Report from related Great Britain Patent Application GB1509298 dated Dec. 17, 2015, 5 pp.

(Continued)

Primary Examiner — Vu B Hang
(74) Attorney, Agent, or Firm — Brooks, Cameron & Huebsch, PLLC

(57) ABSTRACT

Devices, methods, systems, and computer-readable media for adaptive beam forming are described herein. One or more embodiments include a method for adaptive beam forming, comprising: receiving a voice command at a number of microphones, determining an instruction based on the received voice command, calculating a confidence level of the determined instruction, determining feedback based on the confidence level of the determined instruction, and altering a beam of the number of microphones based on the feedback.

19 Claims, 6 Drawing Sheets

(51) Int. Cl.
*G10L 15/30* (2013.01)
*G10L 15/22* (2006.01)
*G10L 21/0208* (2013.01)
*H04R 3/00* (2006.01)
G10L 25/78 (2013.01)
G10L 21/0216 (2013.01)

(52) U.S. Cl.
CPC ...... *G10L 21/0208* (2013.01); *G10L 21/0216* (2013.01); *H04R 3/005* (2013.01); *H04R 3/02* (2013.01); *G10L 25/78* (2013.01); *G10L 2015/223* (2013.01); *G10L 2015/225* (2013.01); *G10L 2021/02166* (2013.01)

(56) References Cited

U.S. PATENT DOCUMENTS

| | | | |
|---|---|---|---|
| 2013/0060571 A1 | 3/2013 | Soemo et al. | |
| 2013/0311175 A1* | 11/2013 | Arakawa | G10L 21/0216 704/226 |
| 2014/0278394 A1* | 9/2014 | Bastyr | G10L 21/0208 704/233 |
| 2014/0316778 A1 | 10/2014 | Venkatesha et al. | |
| 2015/0194152 A1 | 9/2015 | Katuri et al. | |

OTHER PUBLICATIONS

I. Rodomagoulakis, et al. "Experiments on Far-field Multichannel Speech Processing in Smart Homes." Proceedings 18th International Conference on Digital Signal Processing (DSP 2013), Santorini, Greece, Jul. 2013. 6 pages.

Shimpei Soda, et al. "Handsfree Voice Interface for Home Network Service Using a Microphone Array Network." 2012 Third International Conference on Networking and Computing. Graduate School of System Informatics, Kobe University. 6 pages.

Amaya Arcelus, et al. "Integration of Smart Home Technologies in a Health Monitoring System for the Elderly." 21st International Conference on Advanced Information Networking and Applications Workshops. IEEE Computer Society. 2007. 6 pages.

Shimpei Soda, et al. "Introducing Multiple Microphone Arrays for Enhancing Smart Home Voice Control." The Institute of Electronics Information and Communication Engineers. Graduate School of System Informatics, Kobe University. 6 pages.

* cited by examiner

ADAPTIVE BEAM FORMING DEVICES, METHODS, AND SYSTEMS

PRIORITY INFORMATION

This application is a Continuation of U.S. application Ser. No. 14/301,938, filed Jun. 11, 2014, the entire contents of which are hereby incorporated by reference.

TECHNICAL FIELD

The present disclosure relates to methods, devices, system, and computer-readable media for adaptive beam forming.

BACKGROUND

Devices such as computing devices, electrical devices, household devices, can be utilized throughout a building. Each of the devices can have a plurality of functionality and corresponding settings for each functionality. Sound recognition devices (e.g., microphones, etc.) can be utilized to receive sound and/or record sound within a particular area of the building.

Microphones can receive a variety of types of sound. For example, the microphones can receive voices, animal noises, exterior sounds, among other sounds within the particular area of the building. When the microphones are configured to determine a particular type of sound such as human commands, other types of sound can act as noise and make it difficult to determine the particular type of sound.

DETAILED DESCRIPTION

Figure 1:
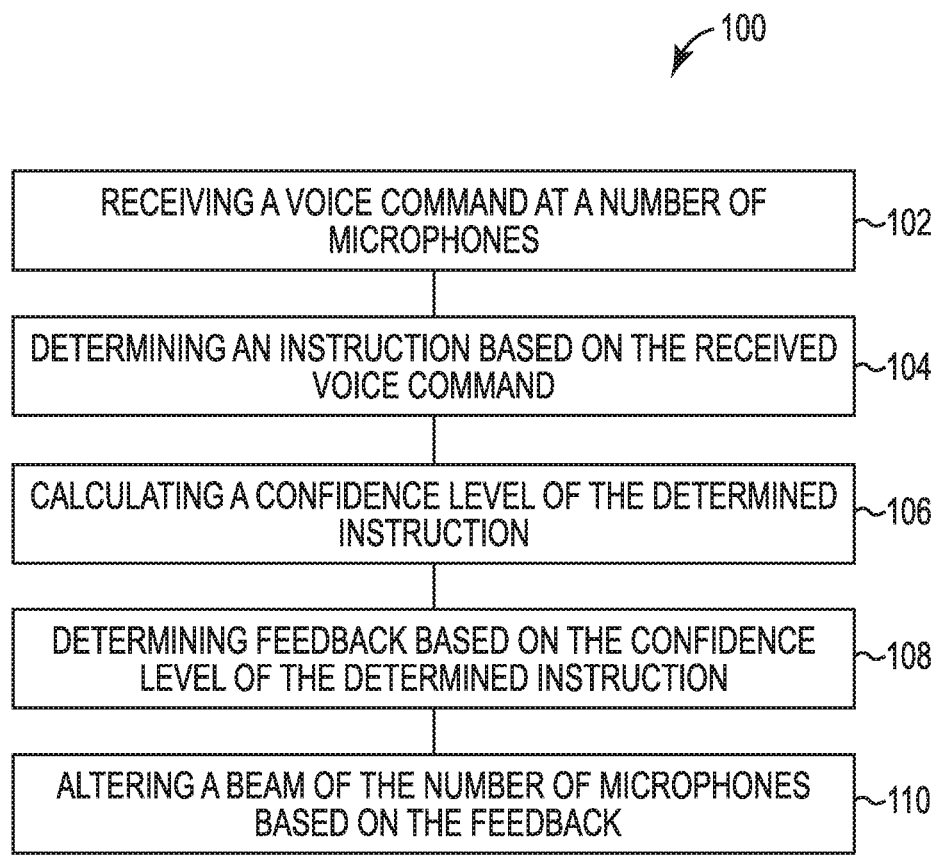
FIG. 1 is an example of a method for adaptive beam forming according to one or more embodiments of the present disclosure.

Devices, methods, systems, and computer-readable media for adaptive beam forming are described herein. For example, one or more embodiments include a method for adaptive beam forming, comprising: receiving a voice command at a number of microphones, determining an instruction based on the received voice command, calculating a confidence level of the determined instruction, determining feedback based on the confidence level of the determined instruction, and altering a beam of the number of microphones based on the feedback.

Adaptive beam forming can be utilized to identify and/or remove noise from a received voice command. As used herein, the noise includes sound and/or interference that is not associated with the received voice command. That is, the noise includes unwanted sound such as: background noises, television, barking dog, radio, talking, among other unwanted sound that may interrupt a quality of the voice command. As used herein, the quality of the voice command includes a quantity of noise received by a microphone with a voice command. In some embodiments, the quality of the voice command can be relatively high when the quantity of noise is relatively low.

The quantity of noise that is received at a microphone can be reduced by identifying and canceling the noise from the received voice command. The noise can be canceled to increase the quality of the received voice command. Identifying and separating the noise from the received voice command can be utilized to provide feedback to an adaptive beam former (e.g., system for adaptive beam forming). The feedback that is provided to the adaptive beam former can be utilized to direct a beam (e.g., direction of a number of microphones receiving a signal, focus of a number of microphones, etc.) of a number of microphones. The adaptive beam former can utilize the feedback to increase the quality of the received voice command by altering the beam of the number of microphones to increase the quality of the received voice command. Increasing the quality of the received voice command can increase an accuracy of voice recognition systems.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of sensors" can refer to one or more sensors. Additionally, the designator "N", as used herein, particularly with respect to reference numerals in the drawings, indicates that a number of the particular feature so designated can be included with a number of embodiments of the present disclosure.

FIG. 1 is an example of a method 100 for adaptive beam forming according to one or more embodiments of the present disclosure. The method 100 can be utilized to receive voice commands that correspond to an instruction that can be performed by a computing device. The method 100 can utilize feedback to alter a beam of a number of microphones to increase a quality of the received voice command.

At box 102 the method 100 can include receiving a voice command at a number of microphones. The voice command can include a vocal instruction from a user (e.g., human user). The voice command can be a vocal instruction to perform a particular function. The particular function can be a function that is performed by a computing device or a device that is communicatively coupled to a computing device. The vocal command can correspond to a set of computer readable instructions (CRI) that can be executed by a processor of a computing device.

The number of microphones can include an array of microphones to form an acoustic beam towards a distant user. The array of microphones can be coupled to a computing device such as a digital signal processor (DSP) that can utilize a beam former algorithm to focus a main lobe of a beam former to a specific direction at a particular time. In some embodiments, the computing device can utilize a delay-sum, multiple signal classification (MUSIC), or estimation of signal parameters via rotational invariant techniques (ESPRIT) beam former algorithm, among other beam former algorithms.

At box 104 the method 100 can include determining an instruction based on the received voice command. Determining the instruction based on the received voice command can include utilizing a noise cancellation technique to remove noise (e.g., unwanted sound, sound not relating to a voice command, background sounds, etc.) from the received voice command. Determining the instruction can also include utilizing a voice recognition technique and/or a voice to text technique to determine text from the voice command.

The text from the voice command can be utilized to determine an instruction that corresponds to the voice command. The instruction can be computer readable instructions (CRIs) that when executed can perform a particular function. For example, the voice command can be a vocal statement from a user that includes a phrase such as, "feeling warm", "lower the temperature", and/or "change the temperature to 65 degrees". The vocal statement can be determined by the voice recognition technique and a corresponding set of instructions can be executed to perform a particular task. For example, the voice command that includes the phrase "change the temperature to 65 degrees" can have a corresponding set of instructions that can be executed by a thermostat to change the temperature settings to 65 degrees Fahrenheit. That is, a particular voice command can correspond to a particular set of instructions that when executed by a processor can perform a particular function.

Determining the instruction can include utilizing a predetermined vocabulary to determine the instruction of the received voice command. The predetermined vocabulary can include a set of words and/or phrases that are recorded and implemented to correspond to particular functions when the words and/or phrases are received by the number of microphones and converted to text as described herein.

At box 106 the method 100 can include calculating a confidence level of the determined instruction. Calculating the confidence level can include determining a signal to noise ratio of the received voice command. The signal to noise ratio can be an indication of the quality of the received voice command. The quality can correspond to an ability of a speech recognition device to recognize the voice command.

The confidence level can be calculated by determining a number of determined phrases from a voice recognition that potentially corresponds to the received voice command. The voice recognition device can determine a plurality of potential phrases that correspond to the received voice command and designate a confidence level for each of the potential phrases based on a likelihood that the potential phrase is the phrase that a user utilized in the voice command. The confidence level can include a percentage that corresponds to a likelihood the determined instruction correctly corresponds to the received voice command.

At box 108 the method 100 can include determining feedback based on the confidence level of the determined instruction. Determining feedback can include determining a number of beam forming alterations that can be performed to increase the confidence level and/or the signal to noise ratio of the received voice command. The determined feedback can be sent to a voice recognition device and/or an adaptive beam former. The adaptive beam former can make a number of beam forming alterations based on the received feedback.

Determining feedback can include determining a location and/or a direction of the received voice command. The location of the received voice command can be utilized to determine a number of beam forming alterations that can be utilized to increase the quality of the received voice command. The feedback can include information relating to noise not relating to the received voice command. For example, the feedback can include information relating to sound that is not sound relating to the received voice command. In one example, the sound that is not relating to the received voice command can include sound from a television or radio that is on in the area where the voice command was received. As described further herein, the television or radio can be considered noise in the signal to noise ratio. Thus, it can be advantageous to determine the direction of the noise in order to remove or decrease the amount of noise from the received voice command in order to increase the quality of the received voice command.

When the feedback is determined it can be sent to the adaptive beam former. The adaptive beam former can alter a beam of the number of microphones and the process can start again to determine an instruction based on the received voice command with the altered beam of the number of microphones. In some embodiments, the feedback includes information relating to optimizing a defined beam width and a defined beam direction of the number of microphones. Optimizing the defined beam width and the defined beam direction can include altering the beam width and beam direction to increase the quality of the received voice command. That is, optimizing the defined beam width and beam direction can include increasing the signal to noise ratio of the received voice command and/or increasing the confidence level of a number of potential phrases or potential instructions of the received voice command.

At box 110 the method 100 can include altering a beam of the number of microphones based on the feedback. Altering the beam of the number of microphones can include altering a beam direction of the number of microphones. In some embodiments, the number of microphones are in an array (e.g., microphone array). A microphone array can include a plurality of microphones that are operating in tandem. In some embodiments, the microphone array can include omnidirectional microphones that are distributed throughout a perimeter of a space (e.g., rooms, offices, etc.) that operate in tandem to receive voice commands.

Utilizing the method 100 can increase the quality of the received voice command by providing feedback to an adaptive beam former. The feedback can indicate a number of features that can be altered by the adaptive beam former in order to increase a quality of the received voice command.

Figure 2:
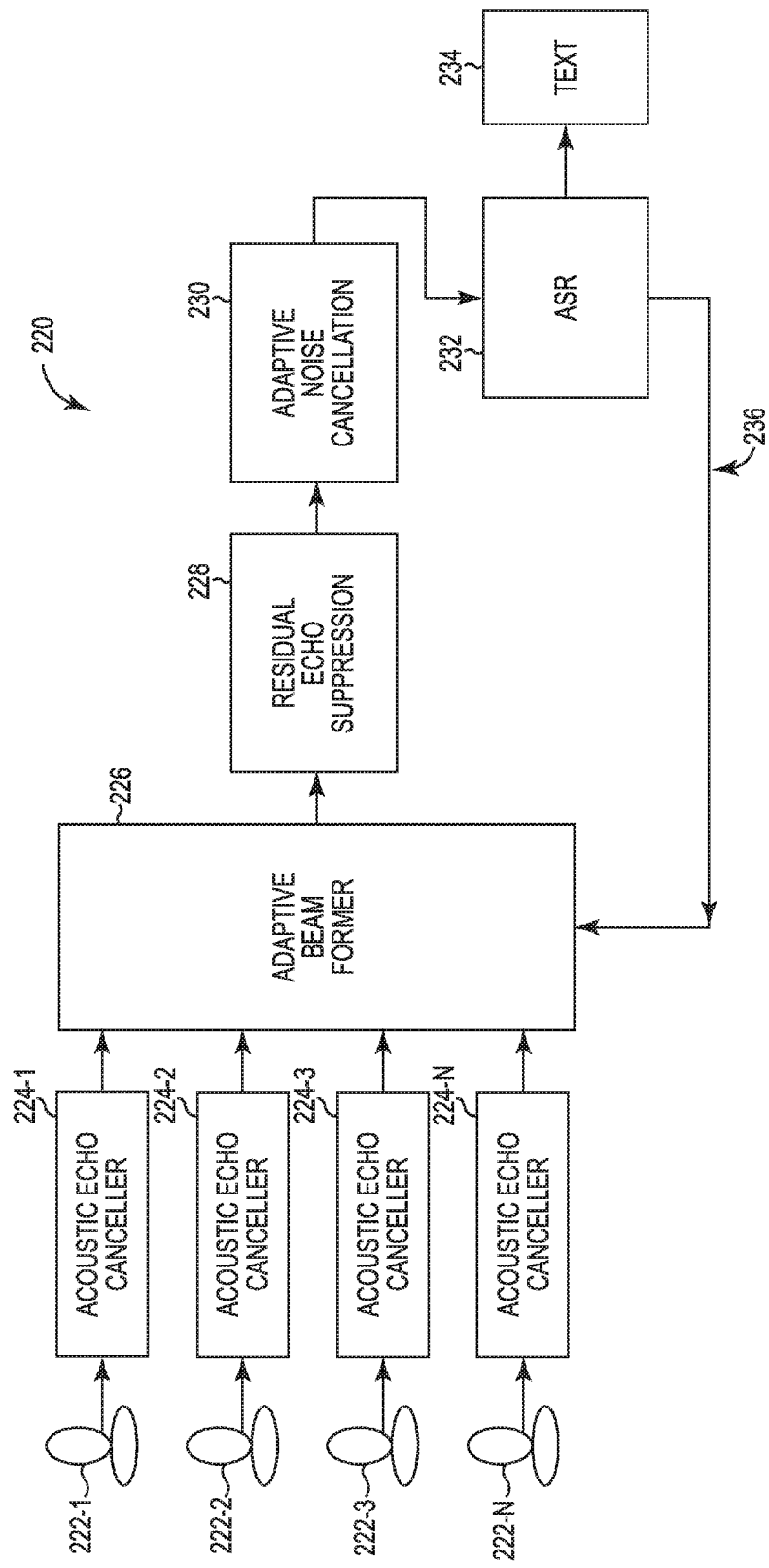
FIG. 2 is an example of a system for adaptive beam forming according to one or more embodiments of the present disclosure.

FIG. 2 is an example of a system 220 for adaptive beam forming according to one or more embodiments of the present disclosure. The system 220 can include a number of microphones 222-1, 222-2, 222-3, . . . , 222-N. The number of microphones 222-1, 222-2, 222-3, . . . , 222-N can be positioned in a microphone array and operate in tandem.

The number of microphones 222-1, 222-2, 222-3, . . . , 222-N can utilize a corresponding acoustic echo canceller device 224-1, 224-2, 224-3, . . . , 224-N. The acoustic echo canceller devices 224-1, 224-2, 224-3, . . . , 224-N can be implemented within each of the corresponding microphones 222-1, 222-2, 222-3, . . . , 222-N or be independent devices that receive the voice command from the number of microphones 222-1, 222-2, 222-3, . . . , 222-N. In some embodiments, there can be a corresponding acoustic echo canceller device for each microphone. In other embodiments, there can be fewer acoustic echo canceller devices than microphones. For example, a plurality microphones can utilize a single acoustic echo canceller device.

The number of acoustic echo cancelers 224-1, 224-2, 224-3, . . . , 224-N can utilize a number of echo cancellation techniques that can remove echo noise that is received by the number of microphones 222-1, 222-2, 222-3, . . . , 222-N. Removing echo noise that is received by the number of microphones 222-1, 222-2, 222-3, . . . , 222-N can increase a quality of the received voice command.

As described herein, the quality of the received voice command can include a signal to noise ratio. The signal can include a voice command of a user and the noise can include other sounds that are not related to the voice command. The signal to noise ratio can be increased by the number of acoustic echo cancelers 224-1, 224-2, 224-3, . . . , 224-N cancelling and/or removing echo noise that is received by the number of microphones 222-1, 222-2, 222-3, . . . , 222-N.

The number of acoustic echo cancelers 224-1, 224-2, 224-3, . . . , 224-N can remove the echo noise from the received voice command and send the voice command to an adaptive beam former 226. The adaptive beam former 226 can alter a beam width and/or beam direction of the number of microphones 222-1, 222-2, 222-3, . . . , 222-N to increase the quality of the received voice command. The beam former 226 can utilize a variety of beam forming techniques to alter a beam direction and/or beam width of a microphone array that can include the number of microphones 222-1, 222-2, 222-3, . . . , 222-N.

The beam former 226 can send the voice command that has been altered by the acoustic echo cancelers 224-1, 224-2, 224-3, . . . , 224-N and/or altered by the beam former 226 to a residual echo suppressor 228. The residual echo suppressor can be utilized to suppress and/or cancel any echo noise that was still included in the received voice command after the voice command was received by the number of microphones 222-1, 222-2, 222-3, . . . , 222-N and altered by the acoustic echo cancelers 224-1, 224-2, 224-3, . . . , 224-N and/or the adaptive beam former 226.

The voice command can be sent from the residual echo suppressor 228 to the adaptive noise canceler 230. The adaptive noise canceler 230 can utilize a variety of adaptive noise cancelling techniques to remove noise from the received voice command. As described herein, noise can include sound or interference within the received voice command that can make it more difficult to determine an instruction from the received voice command. The adaptive noise canceler 230 can remove noise such as sounds that are not relevant and/or related to the voice command that corresponds to a particular instruction.

The voice command can be sent from the adaptive noise canceler 230 to an adaptive speech recognition (ASR) device 232. The ASR device 232 can identify spoken words of the receive voice command and convert the identified spoken words to text data 234 (e.g., text). The ASR device 232 can utilize the text data 234 to determine a corresponding set of instructions for the text data 234. That is, the voice command that is received can include an intended function to be performed by a device and/or a system. Thus, the ASR device 232 can determine the instructions that correspond to the voice command.

The determined instructions can be executed by the ASR device 232 via a processing resource (e.g., processor, computing processor, etc.) to perform the function. In some embodiments, the ASR device 232 can send the determined instructions to a different device (e.g., computing device, cloud network, etc.) that can execute the instructions.

The ASR device 232 can calculate a confidence level for the text data 234. The confidence level can be a value that indicates how likely the determined text data 234 and/or instructions are the intended instructions of the voice command. That is, the confidence level for the text data 234 can include a likelihood that the ASR device 232 has correctly determined the instructions corresponding to the voice command.

The ASR device 232 can utilize the confidence level to determine feedback 236. As described herein, the feedback 236 can include information relating to optimizing a defined beam width and a defined beam direction of the number of microphones in order to optimize the quality of the received voice command. Optimizing the quality of the received voice command can include increasing the signal to noise ratio by eliminating more noise from the received voice command and/or focusing the beam angle and width on the location of the received voice command. That is, the ASR device 232 can determine a location of where the voice command originated. For example, a user can vocally produce the voice command from a corner of a room. In this example, the ASR device 232 can be utilized to determine that the voice command came from the corner of the room and include this information in the feedback 236 provided to the adaptive beam former 226. In this example, the adaptive beam former 226 can focus the beam on the determined corner of the room.

In some embodiments, the ASR device 232 can determine if the feedback 236 is utilized to alter the beam of the number of microphones 222-1, 222-2, 222-3, . . . , 222-N or if the feedback 236 is utilized for future voice commands. The ASR device 232 can utilize the confidence level to determine if the feedback 236 is utilized to reanalyze the same voice command. In some embodiments, a predetermined threshold confidence level can be utilized to determine if the beam of the current voice command is altered or if the feedback is utilized for future voice commands with similar properties (e.g. voice command is from a similar direction, there is similar noise received with the voice command, etc.). That is, if the confidence level is greater than a predetermined threshold, the feedback 236 can be provided to the adaptive beam former 226 with instructions not to reanalyze the voice command. In some embodiments, when the confidence level is less than a predetermined threshold, the feedback 236 can be provided to the adaptive beam former 226 with instructions to alter a beam of the number of microphones 222-1, 222-2, 222-3, . . . , 222-N and reanalyze the received voice command.

Reanalyzing the received voice command can include altering a beam of the number of microphones 222-1, 222-2, 222-3, . . . , 222-N and sending the received voice command with the altered beam to the residual echo suppressor 228, adaptive noise canceler 228, and back to the ASR device 232. The residual echo suppressor 228 and adaptive noise canceler can perform the same and/or similar functions on the received voice command with the altered beam voice command as described herein.

The ASR device 232 can receive the voice command with the altered beam and determine text data 234 as described herein. In addition, the ASR device 232 can determine a confidence level for the received voice command with the altered beam voice command. As described herein, the ASR device 232 can utilize the confidence level to provide feedback 236 to the adaptive beam former 226. If it is determined that the confidence level is greater than a predetermined threshold additional feedback 236 may not be provided to the adaptive beam former 226 and the ASR device 232 can provide the instructions from the received voice command to a processor that can execute the instructions to perform a particular function that corresponds to the instructions.

Figure 3:
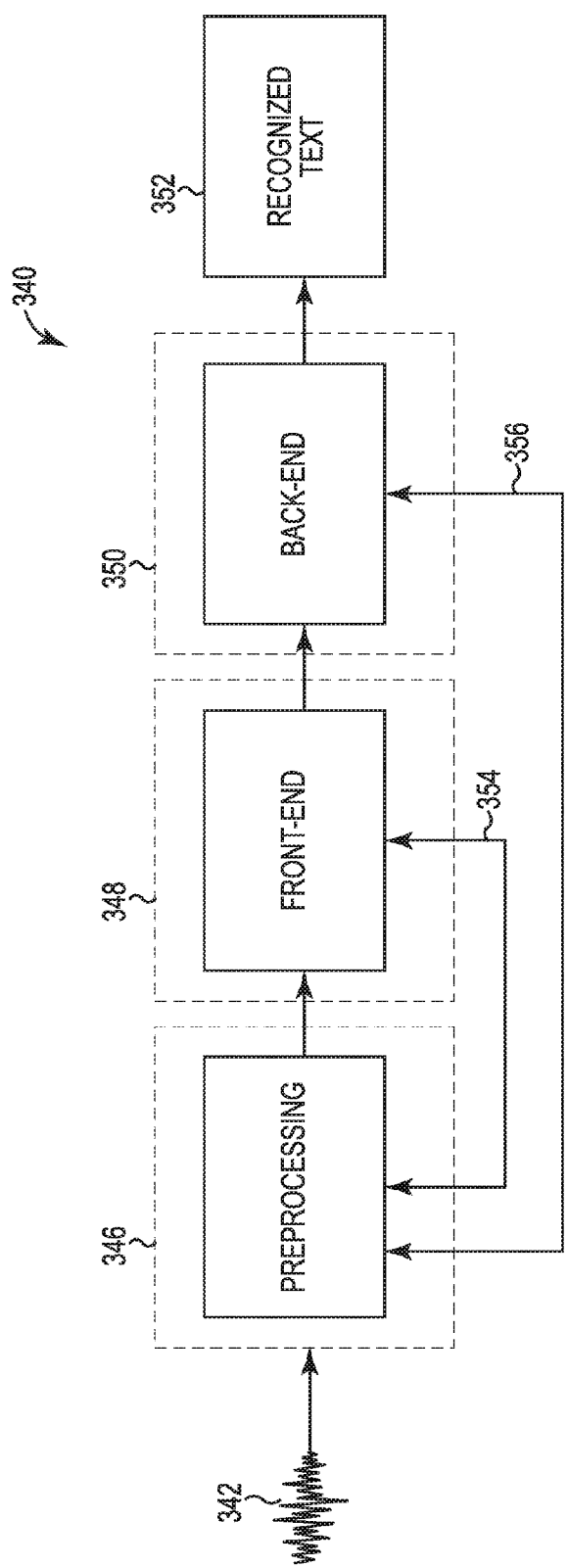
FIG. 3 is an example of a system for adaptive beam forming according to one or more embodiments of the present disclosure.

FIG. 3 is an example of a system 340 for adaptive beam forming according to one or more embodiments of the present disclosure. The system 340 can be utilized to improve speech recognition accuracy and/or sound quality of a received voice command 342. The system 340 can include a number of engines (e.g., preprocessing engine 346, front-end engine 348, back-end engine 350, etc.) that can be utilized to recognize a voice command 342 and determine text data 352 from the voice command 342.

The number of engines can include a preprocessing engine 346 that can be utilized to remove echo noise from the received voice command 342. The preprocessing engine 346 can include a number of processes that increase a quality of the received voice command 342. The number of processes can include removing echo noise from the received voice command, beam forming a number of microphones, and/or altering the beam of the number of microphones. As described herein, the echo noise can be removed in a preprocessing step by acoustic echo cancelers (e.g., acoustic echo cancelers 224-1, 224-2, 224-3, . . . , 224-N as referenced in FIG. 2). In addition, the beam forming and/or altering the beam of the number of microphones can be controlled by an adaptive beam former (e.g., adaptive beam former 226 as referenced in FIG. 2).

The number of engines can include a front-end engine 348. The front-end engine 348 can extract speech parameters of the received voice command 342. The front-end engine 348 can determine the text data 352 that corresponds to the received voice command 342. That is, the front-end engine 348 can utilize an automatic speech recognition (ASR) device (e.g. ASR device 232 as referenced in FIG. 2) to convert the natural language within the received voice command 342 to text data 352. When converting the received voice command 342 to text data 352, the front-end engine 348 can determine a signal to noise ratio of the received voice command 342. The signal to noise ratio can be a value that represents the quality of the received voice command 342. The signal can be a vocal description of a user giving a command to a computing device. The noise can include sound that is received at a microphone that is not related to the vocal description and/or voice command by the user. In these embodiments a relatively high signal to noise ratio can correspond to a relatively good quality and a relatively low signal to noise ratio can correspond to a relatively poor quality of the received voice command 342.

The front-end engine 348 can provide feedback 354 to the preprocessing engine 346. The feedback 354 can include the signal to noise ratio. The feedback 354 can also include additional information that can be utilized by the preprocessing engine 346 to increase the signal to noise ratio. In some embodiments, the feedback 354 can include a position and/or direction of the signal and/or the noise. That is, the feedback 354 can include a direction of the signal and/or the noise that can be utilized by the preprocessing engine 346 to alter a beam of the microphones to a direction that is towards the signal and/or away from the noise.

The number of engines can include a back-end engine 350. The back-end engine 350 can determine a confidence level of the text data 352 determined by the front-end engine 348. The confidence level can include a likelihood the determined text data and/or instruction determined by the front-end engine 348 correctly corresponds to the received voice command 342. The confidence level can be a value that reflects the likelihood that the determined text data 352 and/or instruction correctly corresponds to the received voice command.

The back-end engine can provide feedback 356 to the preprocessing engine 346. The feedback 356 can include the confidence level. As described herein, the confidence level can be utilized to determine if an additional analysis (e.g., reanalyze, etc.) is needed. That is, the confidence level can be utilized to determine if a beam of the number of microphones is altered to increase a quality of the received voice command. The feedback 356 can also include instructions on a number of ways that the preprocessing engine 346 can increase the quality and/or the confidence level. For example, the feedback 356 can include instructions on altering the beam direction of the number of microphones.

In some embodiments, the front-end engine 348 and the back-end engine 350 are performed utilizing a cloud computing network (e.g., distributed computing resources working in tandem over a network, operation of multiple computing devices on a network, etc.). Thus, in some embodiments, the preprocessing can be performed at a physical device and the voice command can be sent from the preprocessing engine 346 to a cloud computing network to perform the functions of the front-end engine 348 and the functions of the back-end engine 350. The feedback 354 from the front-end engine 348 and the feedback 356 from the back-end engine can be utilized by the preprocessing engine 346 to increase a quality of the received voice command 342.

Figure 4:
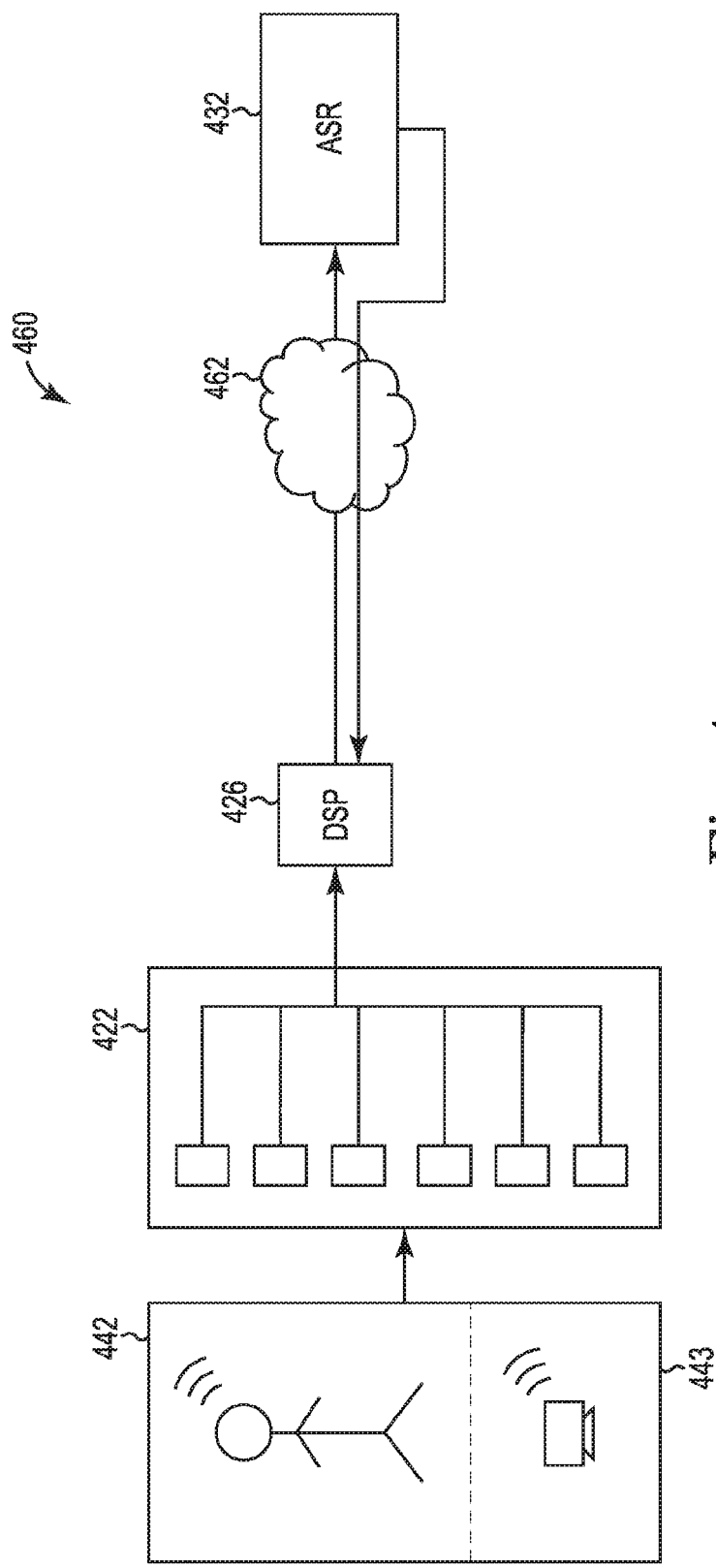
FIG. 4 is an example of a system for adaptive beam forming according to one or more embodiments of the present disclosure.

FIG. 4 is an example of a system 460 for adaptive beam forming according to one or more embodiments of the present disclosure. The system 460 can perform the same and/or additional functions as described in reference to FIG. 1, FIG. 2, and FIG. 3. That is, a microphone array 422 can include a number of microphones operating in tandem to receive a voice command 442 from a user. In some embodiments the voice command 442 can include unwanted noise 443. In system 460, the noise can include sound (e.g., television noise, animal noise, other people speaking, etc.) that is not relevant to the voice command 442 from the user.

The system 460 can include the microphone array 422 sending a received voice command 442 to a digital signal processing (DSP) device 426. The DSP device 426 can be utilized to manipulate and/or alter the received voice command 442 to increase a quality of the received voice command 442. The DSP device can include acoustic echo cancelers (e.g., acoustic echo cancelers 224-1, 224-2, 224-3, . . . , 224-N as referenced in FIG. 2) to remove echo noise from the received voice command 442. In addition, the DSP device can include an adaptive beam former (e.g., adaptive beam former 226 as referenced in FIG. 2) to alter a beam of the microphone array 422. The DSP device can also include a residual echo suppressor (e.g., residual echo suppressor 228 as referenced in FIG. 2) to suppress any residual echo not removed or canceled by the acoustic echo cancelers. Furthermore, the DSP device can include an adaptive noise canceler (e.g., adaptive noise canceler 230 as referenced in FIG. 2) to cancel and/or remove further noise to increase the signal to noise ratio.

The DSP device 426 can perform the functions to increase the quality of the received voice command 442 by removing as much of the noise 443 as possible. The DSP device can send the voice command 442 to an automatic speech recognition (ASR) device 432 via a cloud computing network 462. That is, the processing of the ASR device can be performed utilizing a cloud computing network 462. The ASR device 432 can provide feedback to the DSP device 426. The feedback can include a signal to noise ratio and/or instructions corresponding to altering a beam angle of the microphone array 422.

Figure 5:
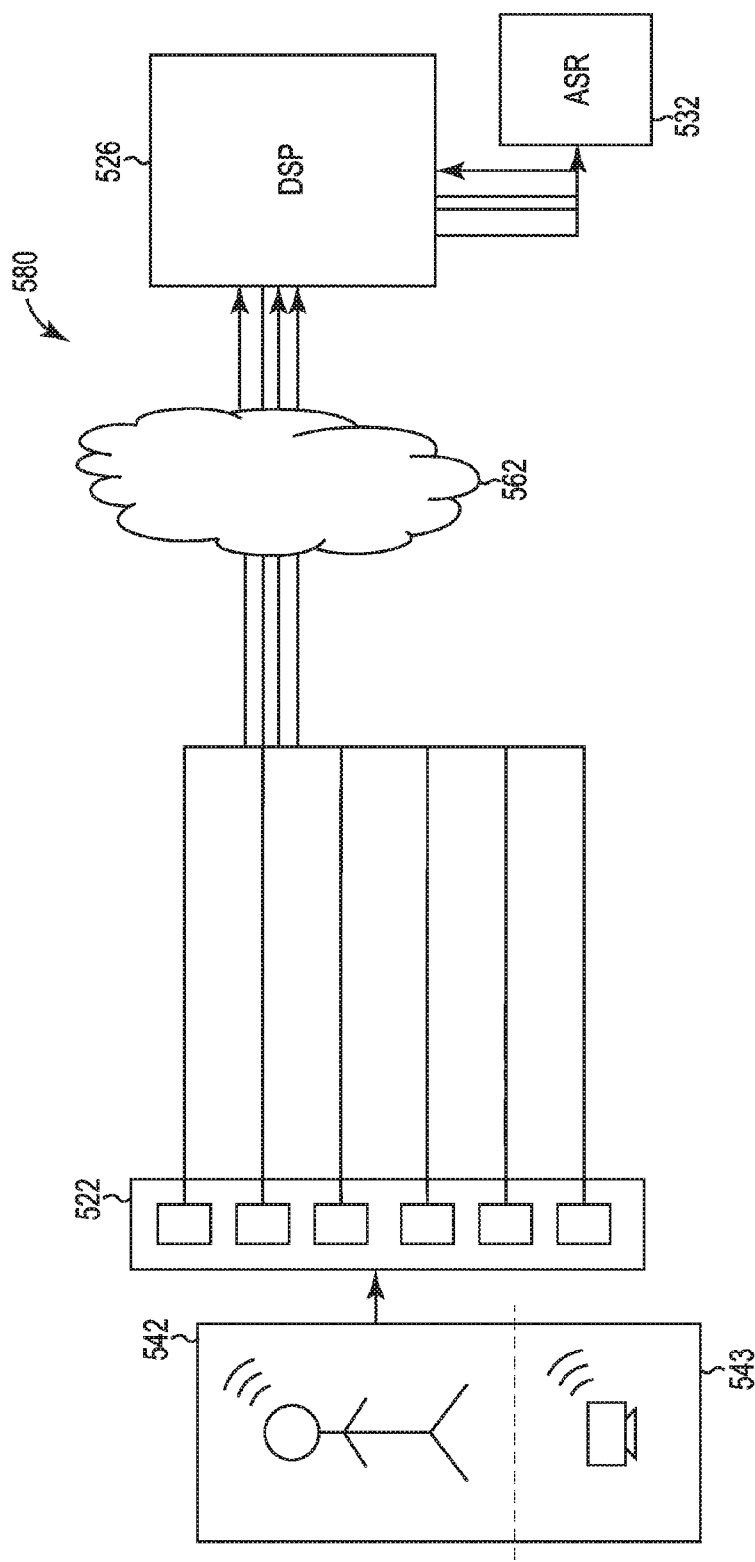
FIG. 5 is an example of a system for adaptive beam forming according to one or more embodiments of the present disclosure.

FIG. 5 is an example of a system 580 for adaptive beam forming according to one or more embodiments of the present disclosure. The system 580 can perform the same and/or additional functions as described in reference to FIG. 1, FIG. 2, and FIG. 3. That is, a microphone array 522 can include a number of microphones operating in tandem to receive a voice command 542 from a user. In some embodiments the voice command 542 can include unwanted noise 543. In system 580, the noise can include sound that is not relevant to the voice command 542 from the user.

The system 580 can include the microphone array 522 sending a received voice command 542 to a digital signal processing (DSP) device 526 via a cloud computing network 562. That is, the functions of the DSP device 526 can be processed and/or executed utilizing a cloud computing network 562. The DSP device 526 can be utilized to manipulate and/or alter the received voice command 542 to increase a quality of the received voice command 542.

The DSP device 526 via the cloud computing network 562 can be communicatively coupled to an automatic speech recognition (ASR) device 532 via the cloud computing network 562. That is, the functions of the ASR device 532 can be processed and/or executed utilizing a cloud computing network 562. The ASR device 532 can provide feedback to the DSP device 526. As described herein, the feedback from the ASR device 532 can include information relating to a signal to noise ratio of the received voice command 542 and/or information relating to altering a beam of the microphone array 522.

By utilizing a cloud computing network 562, the system 580 can more efficiently process the received voice command and process the provided feedback. For example, the cloud computing network 562 can increase the speed of determining a signal to noise ratio and/or the speed of determining feedback on how to increase the signal to noise ratio, which can enable faster determination and conversion of the voice command 542 to text data. In addition, the feedback that is provided can increase an accuracy and/or confidence level of the text data.

Figure 6:
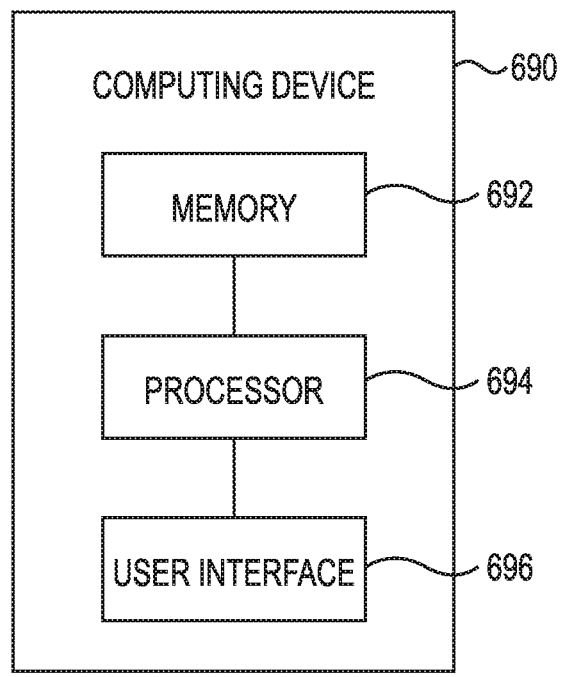
FIG. 6 is an example of a diagram of a device for adaptive beam forming according to one or more embodiments of the present disclosure.

FIG. 6 is an example of a diagram of a computing device 690 for adaptive beam forming according to one or more embodiments of the present disclosure. FIG. 6 illustrates a computing device 690 for determining a deployment of an access control system according to one or more embodiments of the present disclosure. Computing device 690 can be, for example, a laptop computer, a desktop computer, or a mobile device (e.g., a mobile phone, a personal digital assistant, etc.), among other types of computing devices.

As shown in FIG. 6, computing device 690 includes a memory 692 and a processor 694 coupled to memory 692. Memory 692 can be any type of storage medium that can be accessed by processor 694 to perform various examples of the present disclosure. For example, memory 692 can be a non-transitory computer readable medium having computer readable instructions (e.g., computer program instructions) stored thereon that are executable by processor 694 to determine a deployment of an access control system in accordance with one or more embodiments of the present disclosure.

Memory 692 can be volatile or nonvolatile memory. Memory 692 can also be removable (e.g., portable) memory, or non-removable (e.g., internal) memory. For example, memory 692 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 692 is illustrated as being located in computing device 690, embodiments of the present disclosure are not so limited. For example, memory 692 can also be located internal to another computing resource (e.g., enabling computer readable instructions to be downloaded over the Internet or another wired or wireless connection). Although not shown in FIG. 6, computing device 690 can include a display.

As shown in FIG. 6, computing device 690 can also include a user interface 696. User interface 696 can include, for example, a display (e.g., a screen). The display can be, for instance, a touch-screen (e.g., the display can include touch-screen capabilities). User interface 696 (e.g., the display of user interface 696) can provide (e.g., display and/or present) information to a user of computing device 690.

Additionally, computing device 690 can receive information from the user of computing device 690 through an interaction with the user via user interface 696. For example, computing device 690 (e.g., the display of user interface 696) can receive input from the user via user interface 696. The user can enter the input into computing device 690 using, for instance, a mouse and/or keyboard associated with computing device 690, or by touching the display of user interface 696 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for adaptive beam forming, comprising:
   determining a first instruction based on a received first voice command;
   calculating a confidence level of the determined first instruction;
   determining feedback based on the confidence level of the determined first instruction, wherein the feedback includes a location where the first voice command originated and a number of beam forming alterations that can be performed to increase the confidence level of the first voice command;
   altering a beam of a number of microphones based on the number of beam forming alterations of the feedback to determine a second voice command, wherein altering the beam of the number of microphones includes altering a defined beam direction and a defined beam width of the beam based on the determined feedback; and
   determining a second instruction based on the second voice command, wherein the first voice command and the second voice command comprise the same voice command received at the number of microphones.

2. The method of claim 1, wherein the feedback includes information relating to optimizing a defined beam width and a defined beam direction.

3. The method of claim 1, wherein the confidence level includes a percentage that corresponds to a likelihood the determined first instruction correctly corresponds to the received voice command.

4. The method of claim 1, wherein determining feedback includes determining a location where the first voice command originated.

5. The method of claim 1, wherein the feedback includes information relating to noise not relating to the received first voice command.

6. The method of claim 1, wherein determining the first instruction includes utilizing a predetermined vocabulary to determine the second instruction of the received second voice command.

7. A non-transitory computer readable medium, comprising instructions to:
   send a first voice command to a cloud computing network to determine a first instruction of the first voice command;
   receive feedback from the cloud computing network, wherein the feedback includes a location where the first voice command originated and a number of beam forming alterations that can be performed to increase a confidence level of the first voice command;
   alter a beam of a number of microphones based on the feedback to determine a second voice command, wherein the first voice command and the second voice command comprise the same voice command received at the number of microphones; and
   send the second voice command to the cloud computing network to determine a second instruction from the second voice command, wherein the second voice command includes a higher quality compared to the first voice command.

8. The medium of claim 7, wherein the first voice command and second voice command correspond to a number of executable instructions that when executed by a processor to perform a particular function.

9. The medium of claim 7, wherein altering the beam of the number of microphones includes focusing a beam angle and a beam width on the location where the first voice command and second voice command originated.

10. The medium of claim 7, wherein the feedback includes a signal to noise ratio of the received voice command.

11. The medium of claim 7, wherein the feedback includes a quality of the received voice command.

12. The medium of claim 7, wherein instructions to alter the beam of a number of microphones includes altering a beam width and a beam direction of the number of microphones.

13. A system, comprising:
   an array of microphones to receive a number of voice commands from a plurality of beam directions and a plurality of beam widths;
   a signal processor device to define a beam direction from the plurality of beam directions and a beam width from the plurality of beam widths, wherein the signal processor adjusts the defined beam direction and defined beam width based on feedback received from a speech recognition device, wherein the feedback includes a number of beam forming alterations that can be performed to increase a confidence level of the number of voice commands, and wherein the signal processor device stores the feedback for future utilization; and
   the speech recognition device to analyze the received number of voice commands at the defined beam direction and defined beam width, wherein the speech recognition device sends feedback to the signal processor device.

14. The medium of claim 13, wherein the feedback includes parameters of the voice command from each of a plurality of beam angles.

15. The system of claim 13, wherein the feedback includes a location where the number of voice commands originated.

16. The system of claim 13, wherein the signal processor device determines to utilize the stored feedback for a different received voice command when the different received voice command has similar properties to the received voice command.

17. The system of claim 13, wherein the feedback includes an alternate beam angle from the plurality of beam angles and an alternate beam width from the plurality of beam widths to increase a signal to noise ratio of the received number of voice commands.

18. The system of claim 17, wherein the defined beam angle and the defined beam width are altered to the alternate beam angle and the alternate beam width.

19. The system of claim 17, wherein the speech recognition device includes a front end module to determine a signal to noise ratio and a back end module to determine the alternate beam width and the alternate beam width.

* * * * *